United States Patent
Myers

(10) Patent No.: US 7,531,473 B2
(45) Date of Patent: May 12, 2009

(54) YTTERBIUM-PHOSPHATE GLASS

(75) Inventor: John D. Myers, Hilton Head, SC (US)

(73) Assignee: Kigre, Inc., Hilton Head, SC (US)

( * ) Notice: Subject to any disclaimer, the term of this patent is extended or adjusted under 35 U.S.C. 154(b) by 696 days.

(21) Appl. No.: 11/209,603

(22) Filed: Aug. 23, 2005

(65) Prior Publication Data

US 2006/0039426 A1    Feb. 23, 2006

Related U.S. Application Data

(60) Provisional application No. 60/603,616, filed on Aug. 23, 2004.

(51) Int. Cl.
     *C03C 3/16*      (2006.01)
     *C03C 3/19*      (2006.01)
     *C03C 3/17*      (2006.01)

(52) U.S. Cl. ............................... 501/45; 501/47; 501/48

(58) Field of Classification Search ................... 501/45, 501/47, 48
See application file for complete search history.

(56) References Cited

U.S. PATENT DOCUMENTS

| | | | | |
|---|---|---|---|---|
| 4,875,920 A | * | 10/1989 | Myers | ........................ 65/30.14 |
| 4,962,067 A | * | 10/1990 | Myers | ........................... 501/45 |
| 5,053,360 A | * | 10/1991 | Myers | ........................... 501/48 |
| 5,164,343 A | * | 11/1992 | Myers | ........................... 501/48 |
| 6,611,372 B1 | | 8/2003 | Peyghambarian et al. | ....................... 359/341.1 |
| 6,911,160 B2 | * | 6/2005 | Myers et al. | ........... 252/301.4 P |
| 2002/0010065 A1 | * | 1/2002 | Masumura et al. | ............ 501/57 |
| 2005/0003947 A1 | * | 1/2005 | Mazany et al. | ................ 501/32 |
| 2005/0022698 A1 | * | 2/2005 | Mazany et al. | .............. 106/600 |
| 2005/0143250 A1 | * | 6/2005 | Fujiwara et al. | ............... 501/48 |

FOREIGN PATENT DOCUMENTS

WO    WO 2004/041741 A1   *   5/2004

\* cited by examiner

*Primary Examiner*—Karl E Group
*Assistant Examiner*—Elizabeth A Bolden
(74) *Attorney, Agent, or Firm*—Dickinson Wright PLLC

(57) ABSTRACT

A new ytterbium-phosphate glass and a method for producing the same are disclosed. The glass finds special use in forming laser glass. Previously the level of ytterbium that could be incorporated into a phosphate glass without leading to formation of crystals or devitrification was limited. It has been found that much higher levels of ytterbium can be incorporated if an initial glass melt is formed from phosphate and ytterbium prior to adding the other components. Using the present process ytterbium-phosphate glasses having up to 30 mole percent ytterbium can be created. The new glasses function as well and often better than previous ytterbium containing glasses as laser glasses especially when combined with one or more of the lasing ions erbium oxide, neodymium oxide, holmium oxide or thulium oxide.

10 Claims, 1 Drawing Sheet

US 7,531,473 B2

YTTERBIUM-PHOSPHATE GLASS

RELATED APPLICATIONS

This application claims priority to U.S. Provisional Patent Application No. 60/603,616 filed on Aug. 23, 2004.

STATEMENT REGARDING FEDERALLY SPONSORED RESEARCH

NONE

TECHNICAL FIELD

This invention relates generally to phosphate laser glass and more particularly to a phosphate laser glass having very high levels of ytterbium and a novel method for producing the same, these glasses find special use in the form of ultra-short length mini-lasers.

BACKGROUND OF THE INVENTION

A significant impediment to the construction of efficient mini-lasers and amplifiers and certain fiber lasers and amplifiers is the functional requirement that the gain materials have a high absorption coefficient at the pump wavelength. Increasing the concentration of the lasing ion to increase this absorption is usually limited by concentration quenching and ion clustering effects and/or by the solubility limit of the lasing ion in the gain material. In silica, for example, cooperative up-conversion and ion clustering effects occur at high dopant concentrations and can depopulate the metastable level of the active ion. Therefore, increased doping in a silica glass may improve the absorption, but at the expense of the gain. Other glasses, such as commercial phosphate laser glasses exhibit high solubility and large emission cross section for many rare-earth ions without severe concentration quenching and ion clustering effects, thereby permitting much larger dopant concentrations and thus much higher absorptions without sacrificing gain properties. In any case, even in these phosphate glasses, laser ion dopant levels greater than about 10 weight percent suffer from a sharp decrease in gain, thereby severely limiting the absorption length available at the relevant pump radiation wavelength.

Attempts to address this issue in the past have included the use of a more heavily doped sensitizer in conjunction with the low-doped lasing ion. The sensitizer absorbs the pump energy and then transfers that energy to the lasing ion. For example, in U.S. Pat. No. 4,962,067, "Erbium Laser Glass Compositions", the present inventor describes a phosphate glass composition, which uses ytterbium as a sensitizer ion and erbium as the lasing ion. In the '067 patent, the amount of ytterbium is limited by the solubility of ytterbium in the base glass, which appears to be about 8 mole percent $Yb_2O_3$. As is typical in the formation of laser glass the base glass is initially formed and then the sensitizing agents such as ytterbium and lasing ion(s) are added to the base glass. A typical base glass comprises: 50 to 65 mole % phosphate pentaoxide; 10 to 30 mole % of $R_2O$, wherein R is selected from the group Li, Na, K, Rb, Cs, or a mixture thereof; 5 to 25 mole % of MO, wherein M is selected from the group Mg, Ca, Sr, Ba, Zn, and mixtures thereof. The base glass may also include up to 10 mole % of $Al_2O_3$. Attempts to increase the amount of ytterbium in this base glass beyond this amount results in devitrification of the melt and the formation of crystals within the resulting glass. That dopant limitation of about 8 mole percent of ytterbium oxide in the base glass results in a requirement of approximately a 5 millimeter path length of material to absorb 90% of the diode pump energy in the 910 to 970-nanometer range, the useful range for ytterbium-sensitized erbium doped laser glass. For many mini-laser, fiber laser and fiber amplifier applications, 5 millimeters is too long of an absorption length for efficient operation. In addition, applications requiring the side-pumping of fiber lasers and/or end-pumping of double clad fiber lasers and amplifiers also need significant reductions in absorption lengths to become more efficient. Similar limitations are shown in U.S. Pat. No. 6,611,372 wherein the ytterbium in the phosphate glass is at 12 weight % with is approximately 7 mole percent.

In summary, there is a need for a lasing glass that can accommodate larger quantities of sensitizing agents such as ytterbium to raise the output of lasers doped with lasing ions such as erbium, neodymium, holmium, and thulium.

SUMMARY OF THE INVENTION

In general terms, this invention provides a new ytterbium-phosphate glass containing very high levels of ytterbium and a method for making the glass.

In one embodiment, the present invention is a ytterbium-phosphate glass comprising: 60 to 75 mole percent $P_2O_5$, 10 to 30 mole percent $Yb_2O_3$; and from 0 to 30 mole percent of a combination of two or more of the following $X_2O_3$, $R_2O$, and MO wherein; $X_2O_3$ is present in an amount of from 0 to 26 mole percent and X is selected from the group consisting of Al, B, La, Sc, Y, and mixtures thereof; $R_2O$ is present in an amount of from 0 to 26 mole percent and R is selected from the group consisting of Li, Na, K, and mixtures thereof; and MO is present in an amount of from 0 to 26 mole percent and M is selected from the group consisting of Mg, Ca, Sr, Ba, Zn, and mixtures thereof.

In another embodiment, the present invention is a method for forming a ytterbium-phosphate glass comprising the steps of: combining from 60 to 75 mole percent of $P_2O_5$ based on the final composition with from 10 to 30 mole percent $Yb_2O_3$ to form an initial glass melt; adding to the initial glass melt from 0 to 30 mole percent of a combination of two or more of the following $X_2O_3$, $R_2O$, and MO wherein; $X_2O_3$ is present in an amount of from 0 to 26 mole percent and X is selected from the group consisting of Al, B, La, Sc, Y, and mixtures thereof; $R_2O$ is present in an amount of from 0 to 26 mole percent and R is selected from the group consisting of Li, Na, K, and mixtures thereof; and MO is present in an amount of from 0 to 26 mole percent and M is selected from the group consisting of Mg, Ca, Sr, Ba, Zn, and mixtures thereof; and thereby forming the ytterbium-phosphate glass.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

Figure 1:
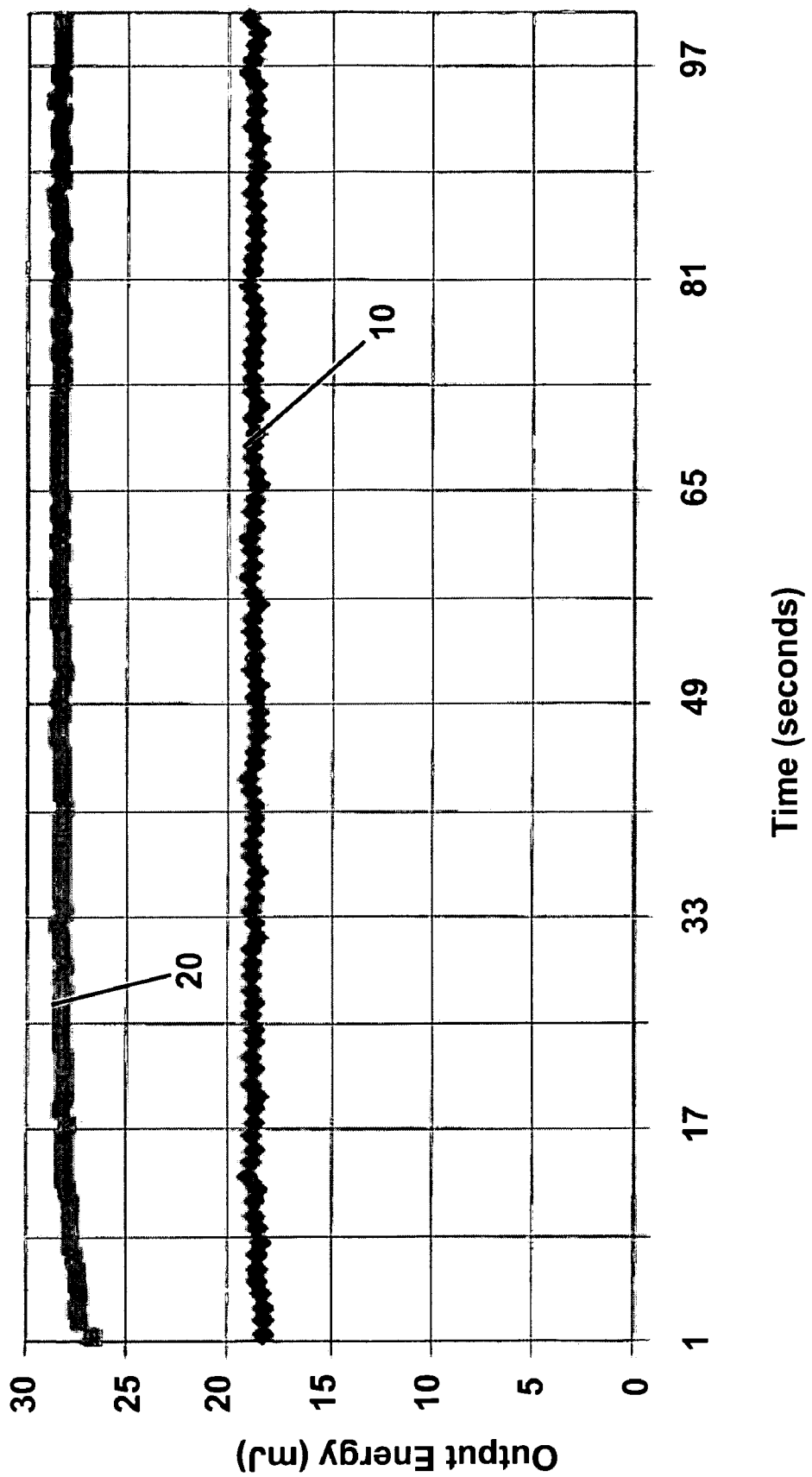
FIG. 1 is a graph showing a comparison of the energy output of a prior art erbium doped laser glass compared to an erbium doped glass prepared according to the present invention.

As discussed above, typically in formation of a laser glass a base glass melt is prepared and then to this base glass are added a sensitizing element, a lazing ion, and any solarization protectants. When this process is followed the practical limit on incorporation of ytterbium is approximately 8 mole percent. As noted this limits the shortness of any lazing element and reduces the output available from a lazing glass doped, for example, with erbium.

In a departure from tradition laser glass forming practice the present inventor set out to determine if a laser glass could be made with higher levels of ytterbium while preventing crystal formation and devitrification of the resulting glass. The present inventor discarded past practice and chose to start with a phosphate-ytterbium base glass to see if this would allow for a larger incorporation of ytterbium and produce a useful laser glass. To his surprise the inventor discovered that a phosphate-ytterbium base glass could be made with much higher levels of ytterbium and that the resulting glass was stable without devitrification and crystal formation at much higher levels than previously attainable. In Table 1 below the results of a series of melts using increasing amounts of ytterbium in the base glass are shown.

TABLE 1

| Glass | Glass Melt Number | | | | |
|---|---|---|---|---|---|
| Characteristic | 1 | 2 | 3 | 4 | 5 |
| $P_2O_5$ (mole %) | 75.0 | 70.0 | 67.5 | 65.0 | 60.0 |
| $Yb_2O_5$ (mole %) | 25.0 | 30.0 | 32.5 | 35.0 | 40.0 |
| Resulting glass | Clear glass | Clear glass | Devitrified glass | Devitrified glass | Devitrified glass |

The results clearly show that using the present process one can dramatically increase the amount of ytterbium that can be incorporated into the glass while preventing devitrification. It would appear that the present process allows for up to 30 mole % ytterbium incorporation into the base glass. This is a dramatic improvement over the prior art limitation of approximately 8 mole %. The characteristics of melt #2 from Table 1, 30 mole % and 54 weight % ytterbium, were as follows: coefficient of thermal expansion of $49 \times 10^{-7}/°C$.; index of refraction of 1.608; Abbe number of 58; and dn/dt of $50 \times 10^{-7}/°C$.

Utilizing the process described above, namely forming a high ytterbium containing phosphate base glass, additional components were added to determine the scope and formulational flexibility of the base glass.

One concern that arose with the new ytterbium-phosphate glass was that this high concentration of ytterbium could have a serious effect on its ability to store and transfer the pump energy to the lasing ion in a laser glass. Therefore, to determine this erbium oxide gain elements made from these ytterbium-phosphate glasses were compared with similar gain elements made from standard phosphate based erbium-ytterbium laser glass. The standard glass was made as in the prior art wherein the base glass without ytterbium and erbium was made and then these were added. The test glass was made per the new process of the present invention wherein the glass base of ytterbium-phosphate was first made and then the other components were added. The two glass melt compositions are given below in Table 2.

TABLE 2

| Component | Test glass | Control glass |
|---|---|---|
| $P_2O_5$ | 60.0 (mole %) | 64.25 (mole %) |
| $Yb_2O_3$ | 22.0 (mole %) | 6.5 (mole %) |

TABLE 2-continued

| Component | Test glass | Control glass |
|---|---|---|
| $K_2O$ | 17.0 (mole %) | 11.0 (mole %) |
| $Li_2O$ | 0.0 | 11.0 (mole %) |
| $B_2O_3$ | 0.0 | 1.0 (mole %) |
| $Al_2O_3$ | 1.0 (mole %) | 6.25 (mole %) |
| $Er_2O_3$ | 0.5 (wgt. %) | 0.5 (wgt. %) |

The gain elements were side pumped with laser diodes at 940 nanometers to excite the ytterbium and the energy output was monitored. The results are shown in FIG. 1. The control glass output is shown in line 10 and the test glass made according to the present invention is shown in line 20. As can be seen the test glass 20 had superior output compared to the typical control glass 10, thus the high level of ytterbium is beneficial and not detrimental to the erbium gain element.

Having shown the benefit of higher levels of ytterbium, preferably 10 mole percent and higher, and the use of the new process additional glasses were made incorporating additional elements. As shown in FIG. 1 the ytterbium-phosphate glass of the present invention enables a dramatic increase in the output of an erbium laser glass. Based on the CRC Handbook of Laser Science and Technology, Vol. 1, pp 244-245, ytterbium can be a sensitizing agent for the following lazing ions: erbium, neodymium, holmium, and thulium. Therefore, in the present specification and claims the term lasing ion includes at least these lazing ions.

As know to those of ordinary skill in the art, glasses can be modified to optimize the index of refraction, the cross section for stimulated emission and other properties such as thermal expansion and index variation with temperature by adding additional components, usually in the oxide form. These ytterbium-phosphate glass compositions, according to the invention, contain a combination of $P_2O_5$ and $Yb_2O_3$ that make up between approximately 70 to 100 mole percent of the final base glass composition, with $Yb_2O_3$ comprising at least 10 mole percent of the base glass composition and up to 30 mole percent and phosphate comprising 60 to 75 mole percent of the base glass. Preferably from about 0 to about 26 mole percent of additional oxides may be substituted to modify the base glass composition thereby providing the 0 to 30 percent not provided by the ytterbium-phosphate. Then the lasing dopants, any additional sensitizers, and anti-solarization agents desired to improve efficiency and to protect the glass from solarizing environments are added to the base glass composition. Key to incorporation of high levels of ytterbium into the glass is the initial formation of a ytterbium-phosphate composition with the high levels of ytterbium, then the other oxides are added to finalize the base glass. Those additional oxides are selected from the following: $X_2O_3$, wherein X is selected from the group of Al, B, La, Sc, Y and combinations thereof; $R_2O$, wherein R is selected from the group of Li, Na, K, and combinations thereof; MO, wherein M is selected from the group of Mg, Ca, Sr, Ba, Zn, and combinations thereof. Further, substitutions for the above oxides of up to approximately 5 mole percent can be made of the oxides of Si, Ge, Pb, and Te and combinations thereof to modify the thermal expansion and index of refraction of the final base glass. To this base glass are then added the oxides of the lasing ion of one or more of the following in there respective amounts in terms of weight percent based on the final weight of the glass: up to about 20 weight percent of erbium oxide; up to about 30 weight percent of neodymium oxide; up to about 10 weight percent of holmium oxide; and up to about 10 weight percent of thulium oxide. Additional components that can be added to the base glass include up to about 10 weight percent of additional oxides such as chromium oxide, niobium oxide, cerium oxide, and antimony oxide for additional sensitization and solarization protection.

In a more preferred embodiment, the foregoing constituents of the base glass are present in the following concentrations: approximately 60 to 70 mole percent $P_2O_5$; 13 to 24 mole percent of $Yb_2O_3$; wherein $P_2O_5+Yb_2O_3$ is approximately 74 to 90 mole percent of the base glass; approximately 0 to 15 mole percent of one or more of $X_2O_3$, wherein X is selected from the group of Al, B, La, Sc, Y and combinations thereof; approximately 2 to 20 mole percent of $R_2O$, where R is selected from the group of Li, Na, and K, and combinations thereof; and 1 to 22 mole percent of MO, where M is selected from the group of Mg, Ca, Sr, Ba, Zn, and combinations thereof. In a most preferred embodiment, the foregoing constituents of the base glass are present in the following concentrations: approximately 60 to 66 mole percent $P_2O_5$; 15 to 22 mole percent of $Yb_2O_3$; wherein $P_2O_5+Yb_2O_3$ is approximately 75 to 82 mole percent of the base glass; approximately 1 to 8 mole percent of one or more of $X_2O_3$, wherein X is selected from the group of Al, B, La, Sc, Y and combinations thereof; approximately 6 to 15 mole percent of $R_2O$, wherein R is selected from the group of Li, Na, and K, and combinations thereof; and 1 to 10 mole percent of MO, wherein M is selected from the group of Mg, Ca, Sr, Ba, Zn, and combinations thereof. For purposes of modifying the optical properties of the laser glass bases as described above, 0 to approximately 5 mole percent of the oxides of Si, Ge, Pb, and Te, or combinations thereof may be substituted for the oxides of X, R, or M in any of the above compositions. For lasing purposes, one or more the lazing lanthanide oxides of Er, Ho, Tm, and Nd may be added to the base glass to their limit of solubility. For sensitization and protection from solarization, additions of up to approximately 10 weight percent of the oxides of Cr, Nb, Ce, Sb or combinations thereof may also be added to the base glass.

In confirmation of lasing properties, laser rods composed of the erbium doped ytterbium-phosphate glass compositions of the present invention were fabricated, tested, and compared with a standard erbium laser rod as described above. Test results indicated that the ytterbium-phosphate glasses made according to the present invention exhibited gain commensurate with the standard erbium laser material or better. In Table 3 below a series of these glass melt compositions are given. All components are in terms of mole percent other than the elements $Er_2O_3$, $CeO_2$, and $Cr_2O_3$ which are in terms of weight %.

TABLE 3

| Component | 1 | 2 | 3 | 4 | 5 | 6 | 7 | 8 | 9 | 10 |
|---|---|---|---|---|---|---|---|---|---|---|
| $P_2O_5$ | 70.0 | 65.0 | 65.0 | 65.0 | 65.0 | 65.0 | 65.0 | 60.0 | 64.0 | 63.0 |
| $Yb_2O_3$ | 30.0 | 20.0 | 20.0 | 20.0 | 20.0 | 20.0 | 20.0 | 15.0 | 10.0 | 13.0 |
| $Li_2O$ | 0.0 | 13.0 | 0.0 | 0.0 | 0.0 | 0.0 | 6.0 | 18.0 | 16.0 | 11.0 |
| $Na_2O$ | 0.0 | 0.0 | 13.0 | 0.0 | 0.0 | 0.0 | 0.0 | 0.0 | 0.0 | 0.0 |
| $K_2O$ | 0.0 | 0.0 | 0.0 | 13.0 | 0.0 | 0.0 | 7.0 | 0.0 | 5.4 | 11.0 |
| $La_2O_3$ | 0.0 | 2.0 | 2.0 | 2.0 | 2.0 | 2.0 | 2.0 | 2.0 | 2.0 | 0.0 |
| BaO | 0.0 | 0.0 | 0.0 | 0.0 | 13.0 | 0.0 | 0.0 | 5.0 | 0.0 | 0.0 |
| SrO | 0.0 | 0.0 | 0.0 | 0.0 | 0.0 | 13.0 | 0.0 | 0.0 | 0.0 | 0.0 |
| $Al_2O_3$ | 0.0 | 0.0 | 0.0 | 0.0 | 0.0 | 0.0 | 0.0 | 0.0 | 2.0 | 2.0 |
| $B_2O_3$ | 0.0 | 0.0 | 0.0 | 0.0 | 0.0 | 0.0 | 0.0 | 0.0 | 1.4 | 0.0 |
| $Er_2O_3$ | 0.15 | 0.15 | 0.15 | 0.15 | 0.15 | 0.15 | 0.15 | 0.15 | 0.15 | 0.15 |
| $CeO_2$ | 1.5 | 1.5 | 1.5 | 1.5 | 1.5 | 1.5 | 1.5 | 1.5 | 1.5 | 1.5 |
| $Cr_2O_3$ | 0.1 | 0.1 | 0.1 | 0.1 | 0.1 | 0.1 | 0.1 | 0.1 | 0.1 | 0.1 |

Additional melts were conducted to determine if higher levels of laser doping ions could be utilized, the melts are given below in Tables 4 and 5. All levels are in terms of mole % except for the dopants $Er_2O_3$, $Nd_2O_3$, $Ho_2O_3$, and $Tm_2O_3$ which are in weight percent.

TABLE 4

| Component | 11 | 12 | 13 | 14 | 15 | 16 | 17 | 18 | 19 | 20 |
|---|---|---|---|---|---|---|---|---|---|---|
| $P_2O_5$ | 60.0 | 60.0 | 60.0 | 64.0 | 64.0 | 64.0 | 64.0 | 64.0 | 64.0 | 64.0 |
| $Yb_2O_3$ | 14.0 | 14.0 | 14.0 | 15.0 | 15.0 | 15.0 | 15.0 | 15.0 | 15.0 | 15.0 |
| $K_2O$ | 25.0 | 25.0 | 25.0 | 21.0 | 0.0 | 0.0 | 0.0 | 0.0 | 0.0 | 0.0 |
| BaO | 1.0 | 1.0 | 1.0 | 0.0 | 18.0 | 18.0 | 18.0 | 10.0 | 10.0 | 10.0 |
| SrO | 0.0 | 0.0 | 0.0 | 0.0 | 3.0 | 0.0 | 0.0 | 11.0 | 0.0 | 0.0 |
| MgO | 0.0 | 0.0 | 0.0 | 0.0 | 0.0 | 3.0 | 0.0 | 0.0 | 11.0 | 0.0 |
| CaO | 0.0 | 0.0 | 0.0 | 0.0 | 0.0 | 0.0 | 3.0 | 0.0 | 0.0 | 11.0 |
| $Er_2O_3$ | 1.0 | 3.0 | 0.0 | 0.0 | 0.0 | 0.0 | 0.0 | 0.0 | 0.0 | 0.0 |
| $Nd_2O_3$ | 0.0 | 0.0 | 0.0 | 0.0 | 0.0 | 0.0 | 0.0 | 0.0 | 0.0 | 0.0 |
| $Ho_2O_3$ | 0.0 | 0.0 | 3.0 | 10.0 | 1.0 | 0.0 | 0.0 | 0.0 | 5.0 | 10.0 |
| $Tm_2O_3$ | 0.0 | 0.0 | 0.0 | 0.0 | 0.0 | 1.0 | 5.0 | 10.0 | 0.0 | 0.0 |

TABLE 5

| Component | 21 | 22 | 23 | 24 | 25 | 26 | 27 | 28 | 29 | 30 |
|---|---|---|---|---|---|---|---|---|---|---|
| $P_2O_5$ | 64.0 | 64.0 | 64.0 | 64.0 | 64.0 | 64.0 | 64.0 | 64.0 | 64.0 | 62.0 |
| $Yb_2O_3$ | 15.0 | 15.0 | 15.0 | 15.0 | 14.0 | 15.0 | 15.0 | 15.0 | 15.0 | 15.0 |
| BaO | 18.0 | 10.0 | 13.0 | 13.0 | 10.0 | 13.0 | 17.0 | 17.0 | 17.0 | 17.0 |
| SrO | 0.0 | 0.0 | 0.0 | 11.0 | 0.0 | 0.0 | 0.0 | 0.0 | 0.0 | 0.0 |
| CaO | 0.0 | 0.0 | 3.0 | 0.0 | 3.0 | 3.0 | 3.0 | 3.0 | 3.0 | 3.0 |
| ZnO | 3.0 | 11.0 | 0.0 | 0.0 | 0.0 | 0.0 | 0.0 | 0.0 | 0.0 | 0.0 |
| $Y_2O_3$ | 0.0 | 0.0 | 5.0 | 0.0 | 1.0 | 5.0 | 1.0 | 1.0 | 1.0 | 1.0 |
| $B_2O_3$ | 0.0 | 0.0 | 0.0 | 5.0 | 10.0 | 0.0 | 0.0 | 0.0 | 0.0 | 0.0 |
| $Er_2O_3$ | 10.0 | 0.0 | 0.0 | 0.0 | 0.0 | 5.0 | 10.0 | 15.0 | 0.0 | 0.0 |
| $Nd_2O_3$ | 0.0 | 10.0 | 0.0 | 0.0 | 20.0 | 0.0 | 0.0 | 5.0 | 15.0 | 12.5 |
| $Ho_2O_3$ | 0.0 | 0.0 | 10.0 | 0.0 | 0.0 | 0.0 | 0.0 | 0.0 | 5.0 | 0.0 |
| $Tm_2O_3$ | 0.0 | 0.0 | 0.0 | 10.0 | 0.0 | 0.0 | 0.0 | 0.0 | 0.0 | 5.0 |

All of the above melts produced glasses that were clear and useful as laser glasses. The glasses performed as well or better than the control glass in terms of energy output. These results demonstrate the value of the present process and invention. The present invention opens the door to much higher output from compact and mini-lasers.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

I claim:

1. A ytterbium-phosphate glass comprising: a base glass comprising 60 to 75 mole percent $P_2O_5$, 13 to 30 mole percent $Yb_2O_3$; and from 0 to 30 mole percent of a combination of two or more of the following $X_2O_3$, $R_2O$, and MO wherein;
   $X_2O_3$ is present in an amount of from 0 to 26 mole percent and X is selected from the group consisting of Al, B, La, Sc, Y, and mixtures thereof;
   $R_2O$ is present in an amount of from 0 to 26 mole percent and R is selected from the group consisting of Li, Na, K, and mixtures thereof; and
   MO is present in an amount of from 0 to 26 mole percent and M is selected from the group consisting of Mg, Ca, Sr, Ba, Zn, and mixtures thereof;
   said ytterbium-phosphate glass further comprising at least one lasing ion selected from the group consisting of erbium oxide, neodymium oxide, holmium oxide, thulium oxide, or a mixture thereof.

2. The ytterbium-phosphate glass as recited in claim 1 wherein the at least one lasing ion is present in an amount of up to 30 weight percent based on the total weight of the glass.

3. The ytterbium-phosphate glass as recited in claim 2 wherein the at least one lasing ion comprises erbium oxide and said erbium oxide is present in an amount of up to 20 weight percent based on the weight of the glass.

4. The ytterbium-phosphate glass as recited in claim 2 wherein the at least one lasing ion comprises neodymium oxide and said neodymium oxide is present in an amount of up to 30 weight percent based on the weight of the glass.

5. The ytterbium-phosphate glass as recited in claim 2 wherein the at least one lasing ion comprises holmium oxide and said holmium oxide is present in an amount of up to 10 weight percent based on the weight of the glass.

6. The ytterbium-phosphate glass as recited in claim 2 wherein the at least one lasing ion comprises thulium oxide and said thulium oxide is present in an amount of up to 10 weight percent based on the weight of the glass.

7. The ytterbium-phosphate glass as recited in claim 1 further comprising from a positive amount up to 5 mole percent of at least one oxide of silicon, germanium, lead, tellurium, or a mixture thereof.

8. The ytterbium-phosphate glass as recited in claim 1 further comprising from a positive amount to 10 mole percent of at least one oxide of chromium, niobium, cerium, antimony, and mixtures thereof.

9. The ytterbium-phosphate glass as recited in claim 1 wherein said base glass comprises $P_2O_5$ present in an amount of from 60 to 70 mole percent, $Yb_2O_3$ present in an amount of from 13 to 24 mole percent; and from 10 to 26 mole percent of a combination of two or more of $X_2O_3$, $R_2O$, and MO wherein;
   $X_2O_3$ is present in an amount of from 0 to 15 mole percent;
   $R_2O$ is present in an amount of from 2 to 20 mole percent; and
   MO is present in an amount of from 1 to 22 mole percent.

10. The ytterbium-phosphate glass as recited in claim 1 wherein said base glass comprises $P_2O_5$ present in an amount of from 60 to 66 mole percent, $Yb_2O_3$ present in an amount of from 15 to 22 mole percent; and from 18 to 25 mole percent of a combination of two or more of $X_2O_3$, $R_2O$, and MO wherein;
   $X_2O_3$ is present in an amount of from 1 to 8 mole percent;
   $R_2O$ is present in an amount of from 6 to 15 mole percent; and
   MO is present in an amount of from 1 to 10 mole percent.

* * * * *